US008874103B2

(12) United States Patent
Fong et al.

(10) Patent No.: US 8,874,103 B2
(45) Date of Patent: Oct. 28, 2014

(54) DETERMINING PROXIMITY OF USER EQUIPMENT FOR DEVICE-TO-DEVICE COMMUNICATION

(71) Applicant: Intel Corporation, Santa Clara, CA (US)

(72) Inventors: Mo-Han Fong, Sunnyvale, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/681,361

(22) Filed: Nov. 19, 2012

(65) Prior Publication Data

US 2013/0303160 A1     Nov. 14, 2013

Related U.S. Application Data

(60) Provisional application No. 61/646,223, filed on May 11, 2012.

(51) Int. Cl.
*H04W 4/00*     (2009.01)
*H04W 24/00*     (2009.01)
(Continued)

(52) U.S. Cl.
CPC ............. *H04J 3/1694* (2013.01); *H04W 36/00* (2013.01); *H04L 29/02* (2013.01);
(Continued)

(58) Field of Classification Search
None
See application file for complete search history.

(56) References Cited

U.S. PATENT DOCUMENTS 7,277,889 B2     10/2007   Addonisio et al.
2004/0068364 A1   4/2004   Zhao et al.
(Continued)

OTHER PUBLICATIONS

3GPP, "Technical Specification Group Radio Access Network; Evolved Universal Terrestrial Radio Access Network (E-UTRAN); Stage 2 functional specification of User Equipment (UE) positioning in E-UTRAN (Release 11)," 3GPP TS 36.305 V11.1.0, Lte Advanced, Sep. 2012, 58 pages.

(Continued)

*Primary Examiner* — Erika A Washington
(74) *Attorney, Agent, or Firm* — Schwabe, Williamson & Wyatt, P.C.

(57)     ABSTRACT

Embodiments of apparatus, packages, computer-implemented methods, systems, devices, and computer-readable media (transitory and non-transitory) are described herein for ascertaining, e.g., by a traffic detection function ("TDF"), that a first user equipment ("UE") and a second UE are, potentially, sufficiently proximate to each other to wirelessly exchange data directly. In various embodiments, an evolved serving mobile location center ("E-SMLC") may be instructed, e.g., by the TDF, to obtain location change data associated with the first and second UEs. In various embodiments, a determination may be made, e.g., by the TDF, based on the location change data, whether the first and second UEs are sufficiently proximate to exchange data directly, and whether the first and second UEs are likely to remain proximate for at least a predetermined time interval. In various embodiments, the first and second UEs may be caused to commence device-to-device ("D2D") communication based on the determination.

21 Claims, 8 Drawing Sheets

(51) Int. Cl.
| | | |
|---|---|---|
| H04W 36/00 | (2009.01) | |
| H04L 29/02 | (2006.01) | |
| H04B 7/06 | (2006.01) | |
| H04W 56/00 | (2009.01) | |
| H04W 72/04 | (2009.01) | |
| H04W 4/06 | (2009.01) | |
| H04B 7/26 | (2006.01) | |
| H04W 72/12 | (2009.01) | |
| H04W 48/20 | (2009.01) | |
| H04W 52/02 | (2009.01) | |
| H04B 7/04 | (2006.01) | |
| H04W 4/22 | (2009.01) | |
| H04W 24/02 | (2009.01) | |
| H04B 1/56 | (2006.01) | |
| H04W 36/22 | (2009.01) | |
| H04W 72/08 | (2009.01) | |
| H04W 24/10 | (2009.01) | |
| H04J 3/16 | (2006.01) | |
| H04B 15/00 | (2006.01) | |
| H04B 7/02 | (2006.01) | |
| H04J 3/00 | (2006.01) | |
| H04W 76/02 | (2009.01) | |
| H04W 16/14 | (2009.01) | |
| H04W 72/02 | (2009.01) | |
| H04W 76/04 | (2009.01) | |
| H04W 88/06 | (2009.01) | |

(52) U.S. Cl.
CPC ............ *H04B 7/0647* (2013.01); *H04W 56/00* (2013.01); *Y02B 60/50* (2013.01); *H04B 7/0639* (2013.01); *H04W 72/0413* (2013.01); *H04W 72/042* (2013.01); *H04B 7/065* (2013.01); *H04W 4/06* (2013.01); *H04W 16/14* (2013.01); *H04B 7/063* (2013.01); *H04B 7/26* (2013.01); *H04W 72/1215* (2013.01); *H04W 48/20* (2013.01); *H04W 52/0212* (2013.01); *H04W 72/02* (2013.01); *H04B 7/0456* (2013.01); *H04B 7/0473* (2013.01); *H04W 4/005* (2013.01); *H04W 4/22* (2013.01); *H04W 24/02* (2013.01); *H04B 1/56* (2013.01); *H04W 76/048* (2013.01); *H04B 7/0486* (2013.01); *H04W 52/0235* (2013.01); *H04B 7/0632* (2013.01); *H04W 36/22* (2013.01); *H04W 72/085* (2013.01); *H04W 24/10* (2013.01); *H04B 15/00* (2013.01); *H04B 7/024* (2013.01); *H04W 88/06* (2013.01); *H04J 3/00* (2013.01); *H04W 72/082* (2013.01); *H04W 76/027* (2013.01)
USPC .................................. 455/426.1; 455/456.1

(56) References Cited

U.S. PATENT DOCUMENTS

| | | | |
|---|---|---|---|
| 2006/0003732 A1* | 1/2006 | Neuhauser et al. | 455/403 |
| 2006/0026678 A1 | 2/2006 | Zakas | |
| 2006/0256008 A1 | 11/2006 | Rosenberg | |
| 2008/0318592 A1 | 12/2008 | Mandalia | |
| 2012/0040696 A1* | 2/2012 | Siomina et al. | 455/456.6 |
| 2012/0135750 A1* | 5/2012 | Lee et al. | 455/456.1 |
| 2013/0159407 A1* | 6/2013 | Koskela et al. | 709/204 |
| 2013/0170398 A1* | 7/2013 | Kwon | 370/255 |
| 2013/0190006 A1* | 7/2013 | Kazmi et al. | 455/456.1 |
| 2013/0195026 A1* | 8/2013 | Johnsson et al. | 370/329 |
| 2013/0288668 A1* | 10/2013 | Pragada et al. | 455/426.1 |
| 2013/0303143 A1* | 11/2013 | Schrader et al. | 455/418 |

OTHER PUBLICATIONS

International Search Report and Written Opinion mailed Sep. 24, 2013 from International Application No. PCT/US2013/040008.

* cited by examiner

DETERMINING PROXIMITY OF USER EQUIPMENT FOR DEVICE-TO-DEVICE COMMUNICATION

CROSS REFERENCE TO RELATED APPLICATIONS

This application claims priority under 35 U.S.C. §119(e) to U.S. Provisional Patent Application No. 61/646,223 entitled "ADVANCED WIRELESS COMMUNICATION SYSTEMS AND TECHNIQUES," filed May 11, 2012, the disclosure of which is incorporated herein by reference.

FIELD

Embodiments of the present invention relate generally to the technical field of data processing, and more particularly, to determining proximity of user equipment ("UE") for device-to-device ("D2D") communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless mobile devices (e.g., user equipment, or "UE") may communicate with each other over a wireless wide area network ("WWAN"), e.g., using radio access technologies ("RAT") such as the 3GPP Long Term Evolution ("LTE") Advanced Release 10 (March 2011) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond.

Some UEs also may be configured to communicate directly with other UEs, e.g., using device-to-device ("D2D") communication. D2D communication may be used, e.g., when UEs initiate communication with each other while within direct wireless range of each other. RATs that may be used in this manner may include 802.11 ("WiFi"), BlueTooth, near field communication ("NFC"), FlashLinq by Qualcomm®, and so forth.

UEs may initiate communication with each other over a WWAN, but may be in, or move into, sufficient proximity to exchange data directly, e.g., using WiFi Direct, BlueTooth, Flashlinq, NFC, etc. Continuing to using WWAN resources to communicate in such a situation may drain WWAN resources that may be put to better use for communications between UEs that are remote from each other.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
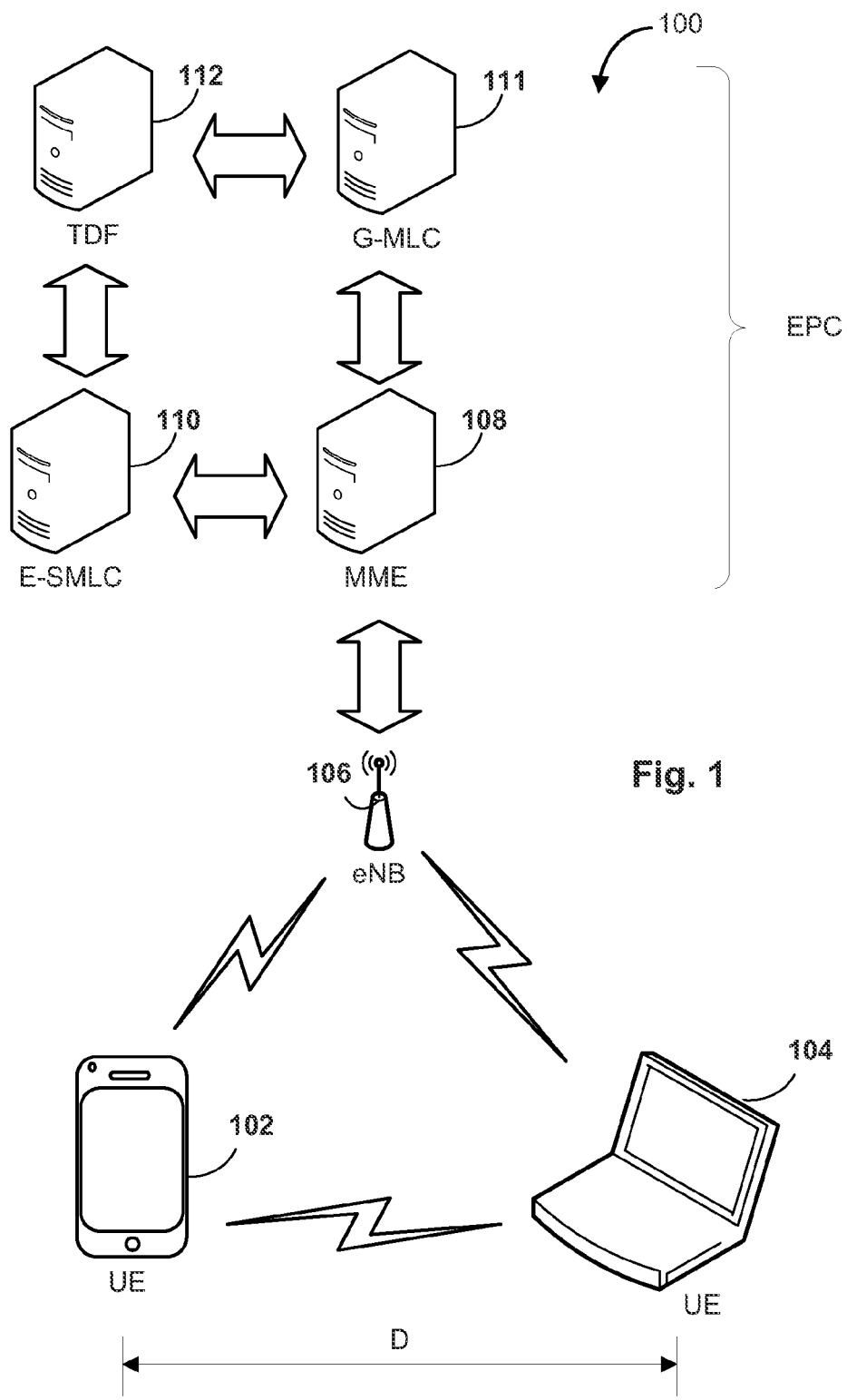
FIG. 1 schematically illustrates various network entities configured with applicable portions of the present disclosure to facilitate commencement of device-to-device ("D2D") communication between user equipment ("UE"), in accordance with various embodiments of the present disclosure.

An example wireless wide area network ("WWAN") 100 is depicted in FIG. 1. A first mobile device in the form of a first user equipment ("UE") 102 (configured with applicable portions of the teachings of the present disclosure) and a second mobile device in the form of a second UE 104 (configured with applicable portions of the teachings of the present disclosure) may be in wireless communication with each other via WWAN 100. In particular, first UE 102 and second UE 104 may be in direct communication with a radio access network ("RAN") via an access point in the form of an evolved Node B ("eNB") 106.

Although first UE 102 is depicted as a touch screen smart phone, and second UE 104 is depicted as a laptop computer, this is not meant to be limiting. As discussed below, mobile devices (e.g., UEs) described herein may be any type of data processing device, including but not limited to a tablet computer, a personal digital assistant ("PDA"), a portable gaming device, and so forth.

eNB 106 may be in network communication with various components of an Evolved Packet Core ("EPC"). For example, eNB 106 may be in network communication with a mobility management entity ("MME") 108. MME 108 may be configured to perform various functions, including but not limited to non-access stratum ("NAS") signaling and NAS signaling security, idle mode UE reachability, public data network ("PDN") and serving gateway selection, MME selection for handoffs, authentication, bearer management functions, and so forth.

MME 108 may itself be in network communication with various other nodes. For instance, MME 108 may be in network communication with an evolved serving mobile location center ("E-SMLC") 110. E-SMLC 110 may be configured to perform various functions related to location services ("LCS"). For example, E-SMLC 110 may manage the support of different location services for target UEs, e.g., including positioning of UEs and delivery of assistance data to UEs. In various embodiments, E-SMLC 110 may interact with the serving eNB (e.g., 106) for a target UE (e.g., 102, 104) in order to obtain position measurements for the target UE. These position measurements may include but are not limited to uplink measurements made by the serving eNB and downlink measurements made by the target UE. The downlink measurements may have been provided to the serving eNB as part of other functions, such as support of handover. E-SMLC 110 may interact with a target UE (e.g., 102, 104) in order to deliver assistance data if requested for a particular location service, or to obtain a location estimate if that was requested. In various embodiments, in addition to or instead of E-SMLC 110, a gateway mobile location center ("G-MLC") 111 may perform similar functions as E-SMLC 110.

For positioning of a target UE (e.g., 102, 104), E-SMLC 110 (or G-MLC 111) may determine the positioning method to be used, based on factors such as LCS client type, a required quality of service ("QoS"), UE positioning capabilities, and/or eNB positioning capabilities. E-SMLC 110 may invoke these positioning methods in the target UE and/or serving eNB. UE-based positioning methods may yield a location estimate. UE-assisted and network-based positioning methods may yield positioning measurements. E-SMLC 110 may combine received results and, based on those results, determine a single location estimate for the target UE, as well as other information such as an accuracy of the estimate.

E-SMLC 110 (or G-MLC 111) may be in network communication with various other network entities. For instance, E-SMLC 110 may be in network communication with a traffic detection function ("TDF") 112. While TDF 112 is depicted in FIG. 1 as operating on a separate server computer, this is not meant to be limiting. TDF 112 may be implemented using any combination of hardware and software on any network computing device, such as those shown in FIG. 1 and others that are not shown but are often found in wireless communication networks. Moreover, in various embodiments, one or more of the entities depicted in FIG. 1 may be implemented on the same or different computing devices.

In various embodiments, if first UE 102 and second UE 104 are sufficiently proximate, and assuming both first UE 102 and second UE 104 are equipped with the same direct radio access technology ("RAT"), e.g., WiFi Direct, Bluetooth, near field communication ("NFC"), Flashlinq, etc. then first UE device 102 and second UE device 104 may be able to exchange data directly. For example, in FIG. 1, assume first UE 102 and second UE 104 are in communication already via WWAN 100 and are separated by a distance D. If D is less than a particular threshold, such as a maximum range of a particular RAT, then first UE 102 and second UE 104 may be able to communicate directly, e.g., using device-to-device ("D2D") communication, rather than through WWAN 100.

However, while first UE 102 and second UE 104 may momentarily be within sufficient proximity to commence D2D communication, they might not necessarily remain in sufficient proximity for long enough to justify a transition to D2D communication. For instance, a user of first UE 102 may be moving in one direction, and a user of second UE 104 may be moving in a different direction. The WWAN resources gained by commencing D2D communication between first UE 102 and second UE 104 may not be worth the network resources expended to implement the transition if the D2D communication will be short-lived.

Accordingly, in various embodiments, various network entities may be configured to determine not only whether first UE 102 and second UE 104 are sufficiently proximate to exchange data directly, but also whether they will remain proximate for an amount of time that justifies commencing D2D communication between the UEs.

In various embodiments, TDF 112 may be configured to ascertain that first UE 102 and second UE 104 are, potentially, sufficiently proximate to each other to wirelessly exchange data directly. Various events may cause TDF 112 to make this ascertainment. As one non-limiting example, eNB 106 may determine that it is serving both first UE 102 and second UE 104. In such case, eNB 106 may be configured to transmit a request (e.g., an LCS request) to TDF 112 to determine whether first UE 102 and second UE 104 are sufficiently proximate to exchange data directly, e.g., using D2D communication. As another non-limiting example, first UE 102 or second UE 104 may itself determine that there is a possibility that the other is, potentially, sufficiently proximate to commence D2D communication. In such case, the UE device may transmit a request (e.g., an LCS request) to TDF 112 to determine whether first UE 102 and second UE 104 are sufficiently proximate to exchange data directly.

Upon ascertaining that first UE 102 and second UE 104 are, potentially, sufficiently proximate to exchange data directly, TDF 112 may instruct E-SMLC 110 (or G-MLC 111) to obtain location change data associated with the first UE 102 and/or second UE 104. As used herein, the term "location change data" may include any data that demonstrates a change of location of a UE. For instance, location change data may include a velocity of a UE. Being a vector, a UE velocity may include a both speed component and a direction component. For instance, if the distance D between first UE 102 and second UE is growing at a particular rate over time, that may indicate that first UE 102 and second UE 104 are moving away from each other. Location change data may include any other indications of movement of UEs, such as acceleration.

Figure 2:
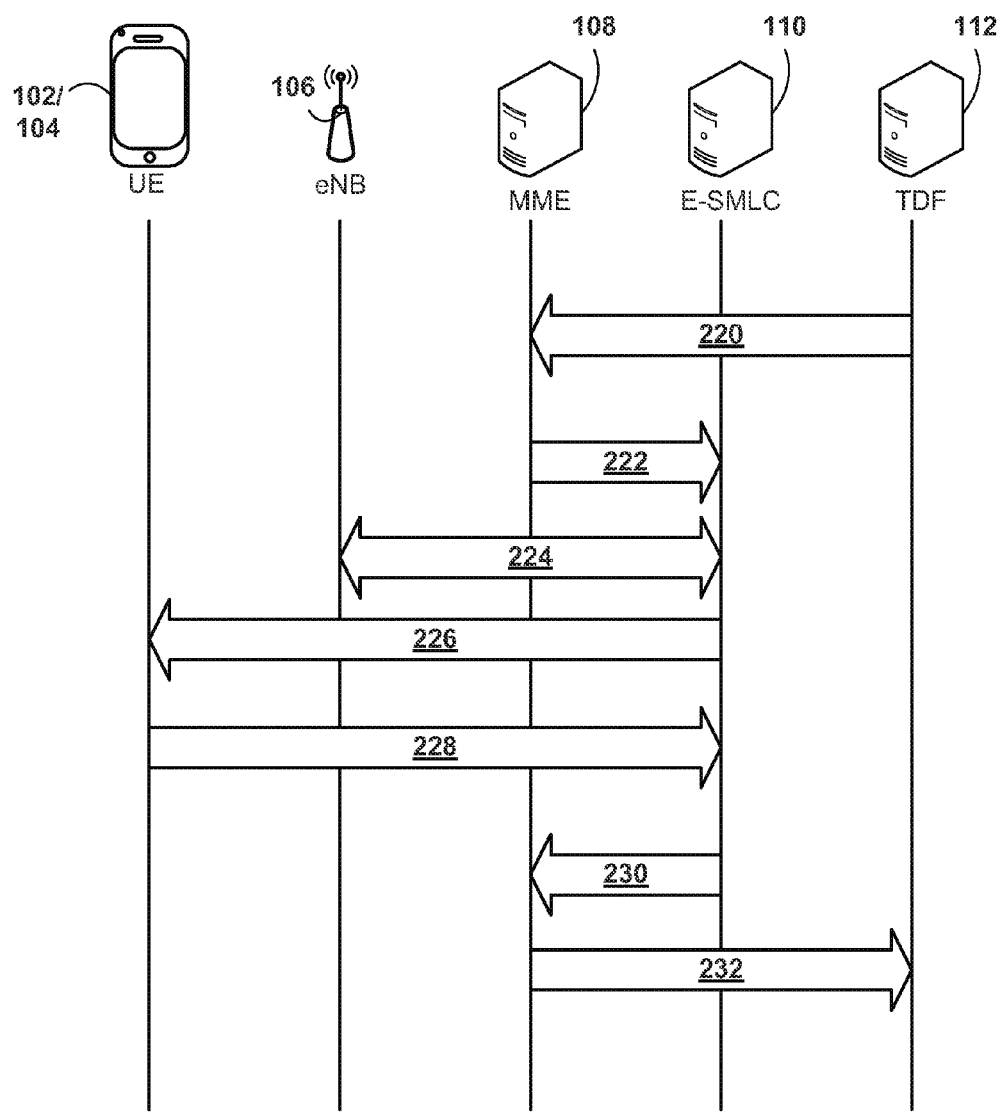
FIG. 2 schematically depicts an example of communications that may be exchanged between various network entities configured with applicable portions of the teachings of the present disclosure, in accordance with various embodiments of the present disclosure.

In some embodiments, TDF 112 may instruct E-SMLC 110 (or G-MLC 111) to obtain location change data associated with one or more UEs via a direct signaling interface. In other embodiments, such as the example shown in FIG. 2, this may be done through other nodes. Referring now to FIG. 2, at arrow 220, TDF 112 may send a request for location change information associated with the first UE 102 and/or second UE 104 to MME 108. At arrow 222, MME 108 may forward this request to E-SMLC 112 (or G-MLC 111). In other embodiments, TDF 112 may transmit this instruction via other nodes. For example, TDF 112 may transmit the instruction to E-SMLC 110 (or G-MLC 111) through MME 108, e.g., using a logical tunnel.

At arrow 224, E-SMLC 110 (or G-MLC 111) may instigate location procedures with serving eNB 106. For example, E-SMLC 110 (or G-MLC 111) may request that eNB 108 provide location change data associated with first UE 102 and/or second UE 104. In various embodiments, E-SMLC 110 (or G-MLC 111) may also obtain assistance data from eNB 106, for provision to a target UE such as 102 or 104.

Additionally or alternatively to arrow 224, at arrow 226, E-SMLC 110 (or G-MLC 111) may instigate location procedures with UE 102 or 104. In various embodiments, E-SMLC 110 (or G-MLC 111) may obtain a location estimate (e.g., a GPS coordinate) or location change data from UE 102 or 104. In various embodiments, E-SMLC 110 (or G-MLC 111) may transfer, to UE 102 or 104, the assistance data obtained from eNB 106 at block 224. This assistance data may be used to assist with UE-based and/or UE-assisted positioning methods. At arrow 228, UE 102 or 104 may transmit location change data associated with first UE 102 or second UE 104 to E-SMLC 110 (or G-MLC 111), e.g., through eNB 106 and/or MME 108.

Upon receiving location change data associated with first UE 102 and/or second UE 104, E-SMLC 110 (or G-MLC 111) may provide the location change data to TDF. In some embodiments, e.g., where TDF 112 and E-SMLC 110 (or G-MLC 111) establish a direct signaling interface, this communication may be sent directly. In other embodiments, such as the one depicted in FIG. 2, at arrow 230, E-SMLC 110 (or G-MLC 111) may forward the location change data to MME 108. MME 108 may in turn forward the location change data to TDF 112 at arrow 232.

Once it receives the location change data, TDF 112 may determine, based on the location change data, whether first UE 102 and second UE 104 are sufficiently proximate to exchange data directly, and whether they are likely to remain proximate for at least a predetermined time interval. In various embodiments, the predetermined time interval may be selected to be long enough so that the benefits of commencing D2D communication (e.g., reduced WWAN network traffic) outweigh the costs of the transition. This predetermined time interval may be set, e.g., by a network administrator, or may be dynamic, e.g., based on current network traffic. In various embodiments, the determination as to whether the UEs will remain proximate for a sufficient time may be made based on various laws of physics and motion. For instance, relative velocities and/or accelerations of two UEs reveal, e.g., as input in standard physics/motion equations, that the UEs will be within direct wireless range for a sufficient amount of time to justify commencement of D2D communication.

If TDF 112 determines that first UE 102 and second UE 104 will be in proximity for at least the predetermined time interval, TDF 112 may cause first UE 102 and second UE 104 to commence D2D communication. For example, in various embodiments, TDF 112 may instruct MME 108 to cause first UE 102 and second UE 104 to commence D2D communication. In various embodiments, MME 108 may utilize NAS signaling to instruct first UE 102 and second UE 104 to commence D2D communication.

Figure 3:
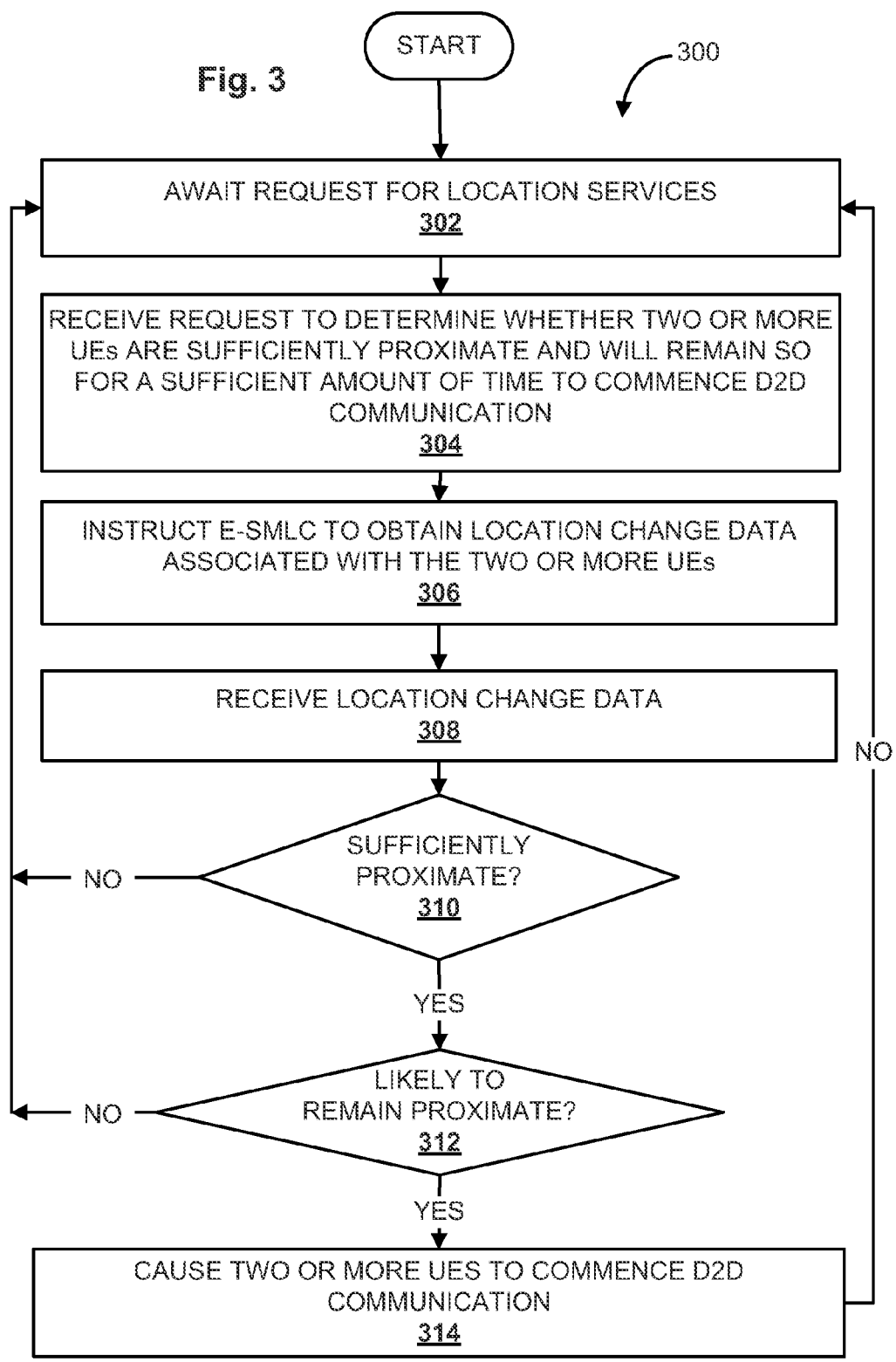
FIG. 3 schematically depicts an example method that may be implemented by a traffic detection function ("TDF"), in accordance with various embodiments of the present disclosure.

FIG. 3 depicts an example method 300 that may be implemented by a computing device as part of operating a TDF such as TDF 112. At block 302, TDF 112 may await a request to instigate and/or perform location services. At block 304, TDF 112 may receive, from various network nodes, a request to determine whether two or more UEs, e.g., first UE 102 and second UE 104, exchanging data indirectly through a WWAN are in sufficient proximity to exchange data directly, e.g., using D2D communication. The request may also seek to have TDF 112 determine whether the first and second UEs will be proximate for a sufficient amount of time, such as a predetermined time interval, to warrant commencement of D2D communication.

At 306, TDF 112 may instruct an E-SMLC or G-MLC, e.g., E-SMLC 110, to obtain location change data associated with the first and second UEs (e.g., 102 and 104). In some embodiments, TDF 112 may have a direct signaling interface with E-SMLC 110, and therefore may transmit this instruction directly, e.g., bypassing MME 108. In other embodiments, TDF 112 may transmit this instruction to MME 108, which in turn may forward the instruction to E-SMLC 110. At block 308, TDF 112 may receive location change data, e.g., from E-SMLC 110 by way of MME 108.

At block 310, TDF 112 may determine, based on the received location change data, whether the first and second UEs are sufficiently proximate to exchange data directly. If the answer is yes, then at block 312, TDF 112 may determine whether the first and second UEs are likely to remain proximate for at least a predetermined time interval (e.g., based on standard laws of physics/motion). If the answer is yes, then at block 314, TDF 112 may cause first UE 102 and second UE 104 to commence D2D communication. If the answer at either block 310 or block 312 is no, then method 300 may proceed back to block 302.

Figure 4:
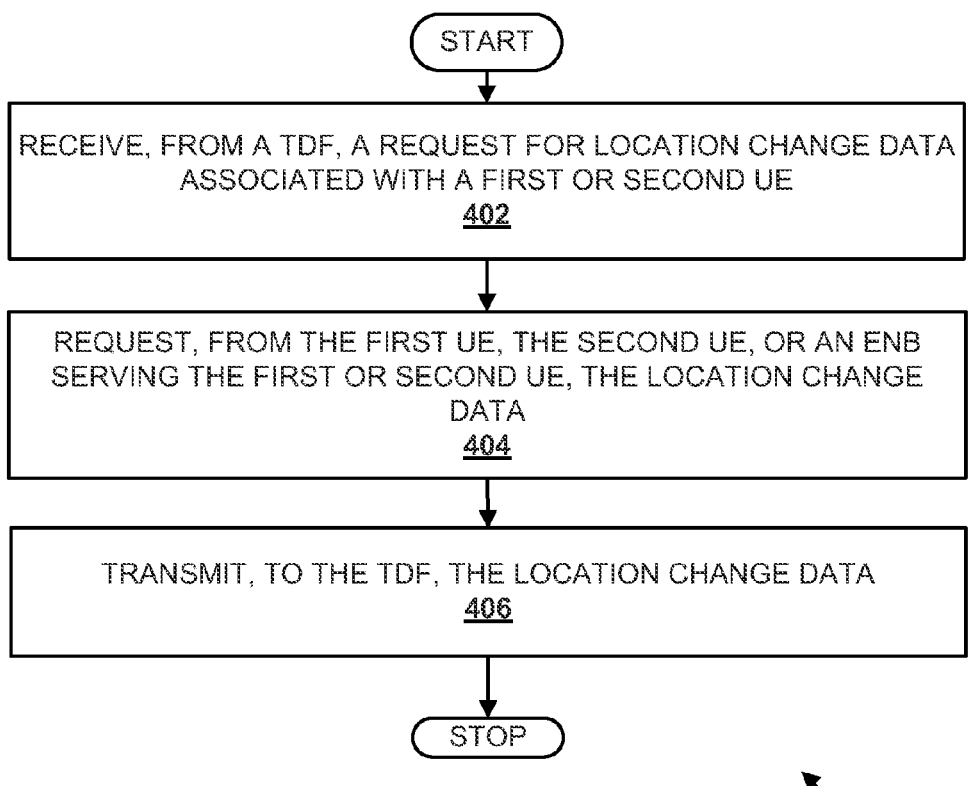
FIG. 4 schematically depicts an example method that may be implemented by an evolved serving mobile location center ("E-SMLC"), in accordance with various embodiments.

FIG. 4 depicts an example method 400 that may be implemented by, e.g., E-SMLC 110 or G-MLC 111, in accordance with various embodiments. At block 402, E-SMLC 110/G-MLC 111 may receive, e.g., from TDF 112, a request for location change data associated with first UE 102 or second UE 104. At block 404, E-SMLC 110/G-MLC 111 may request, e.g., from first UE 102, second UE 104, or eNB 106 serving first UE 102 or second UE 104, the location change data. At block 406, E-SMLC 110/G-MLC 111 may transmit the location change data, e.g., to TDF 112.

Figure 5:
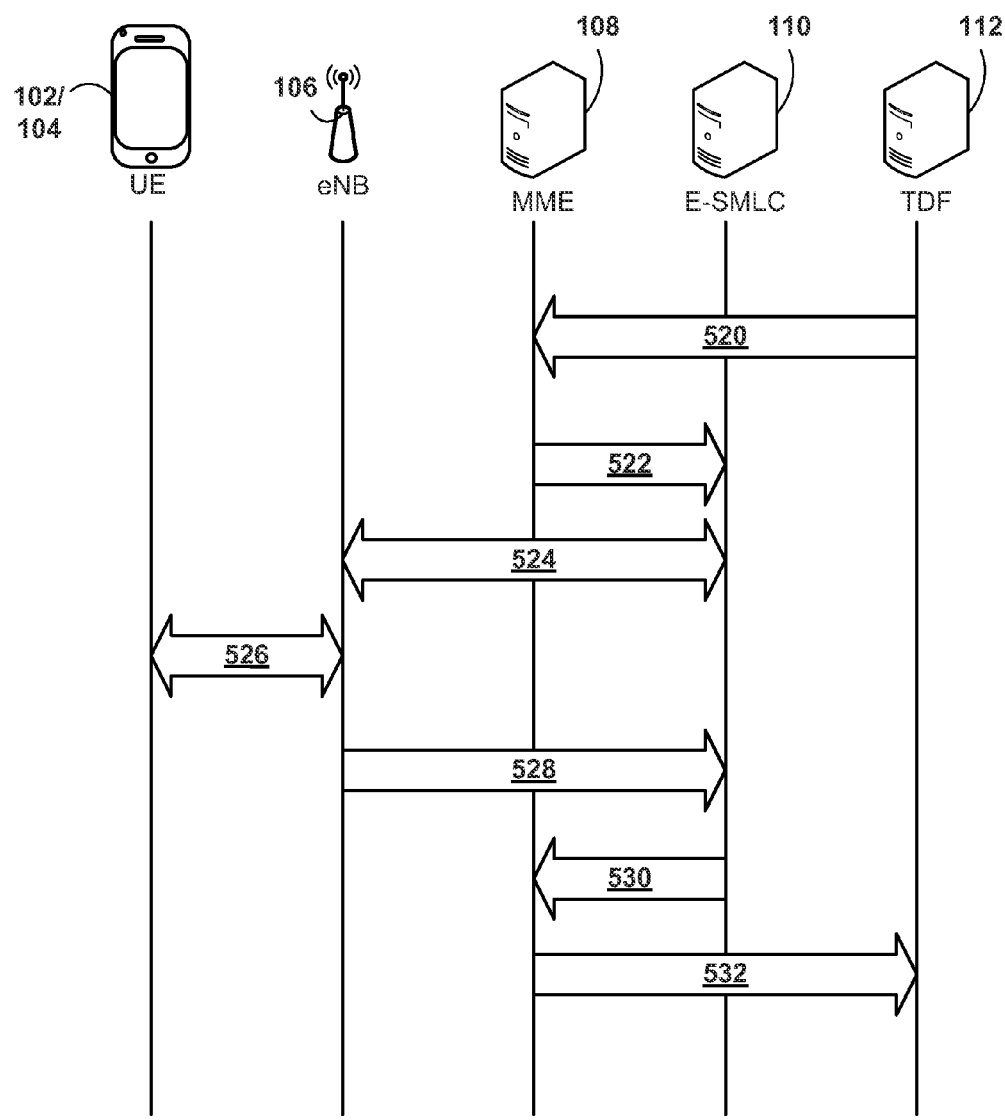
FIG. 5 schematically depicts an example of communications, similar to those shown in FIG. 2, that may be exchanged between various network entities configured with applicable portions of the teachings of the present disclosure, in accordance with various embodiments of the present disclosure.

FIG. 5 depicts a slight variation of the data exchange shown in FIG. 2. In this example, arrows 520, 522 524, 530 and 532 represent data exchanges similar to those represented by arrows 220, 222, 224, 230 and 232 in FIG. 2, respectively. However, FIG. 5 differs from FIG. 2 at arrows 526 and 528. Rather than E-SMLC 110 (or G-MLC 111) instigating location procedures with UE 102 or 104, at arrow 626, eNB 106 may instigate (e.g., at the request of E-SMLC 110) location procedures with UE 102 or 104. For example, eNB 106 may encapsulate a request for location services in an radio resource control ("RRC") and/or NAS signal to UE 102 or UE 104. UE 102 or 104 may encapsulate a response in an RRC and/or NAS signal back to eNB 106. eNB 106 may then forward the UE location data to E-SMLC 110 at arrow 528.

Figure 6:
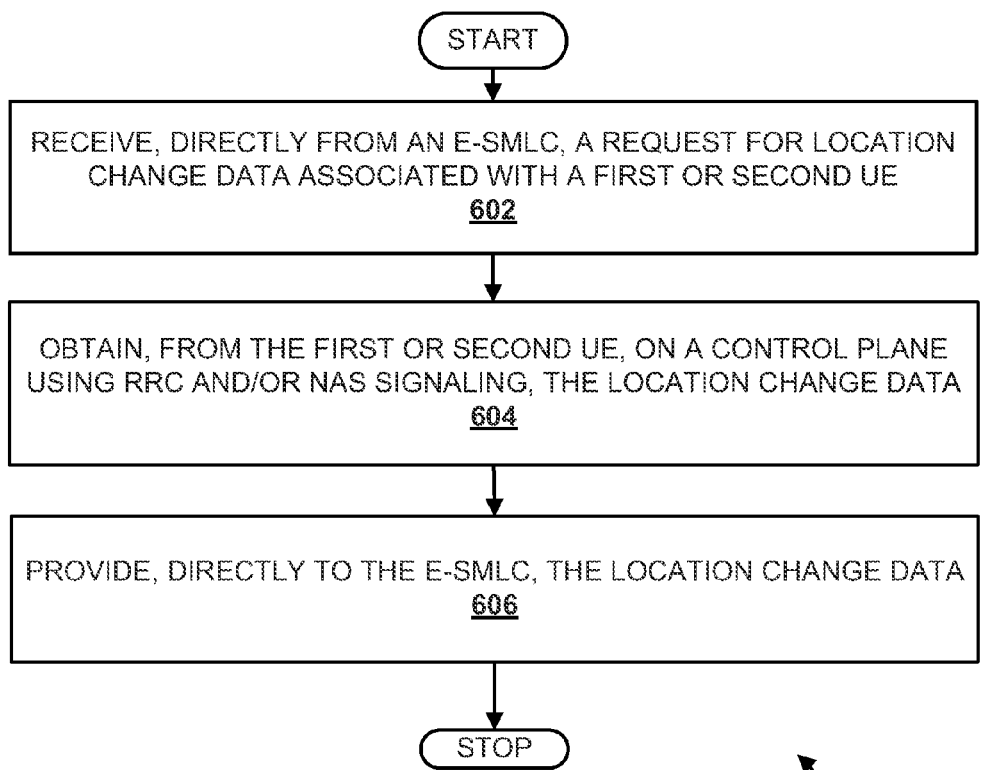
FIG. 6 schematically depicts an example method that may be implemented by an evolved Node B ("eNB"), in accordance with various embodiments.

FIG. 6 depicts an example method 600 that may be implemented by, e.g., eNB 106, to exchange communications as shown in FIG. 5. At block 602, eNB 106 may receive, e.g., from E-SMLC 110 (or G-MLC 111), a request for location change data associated with first UE 102 or a second UE 104. At block 604, eNB 106 may obtain, e.g., from first UE 102 or second UE 104, e.g., on a control plane over an air interface using RRC and/or NAS signaling, the location change data. For example, eNB 106 may encapsulate a location message (e.g., a request) into an RRC and/or NAS message and send it first UE 102 using RRC. First UE 102 may decapsulate the RRC and/or NAS message and consume the contents (e.g., the request). First UE 102 may likewise encapsulate location change data into a return RRC and/or NAS message, and send it back to eNB 106 using RRC and/or NAS signaling. At block 606, eNB 106 may decapsulate the message and provide the contents, e.g., the location change data, to E-SMLC 110 (or G-MLC 111).

Figure 7:
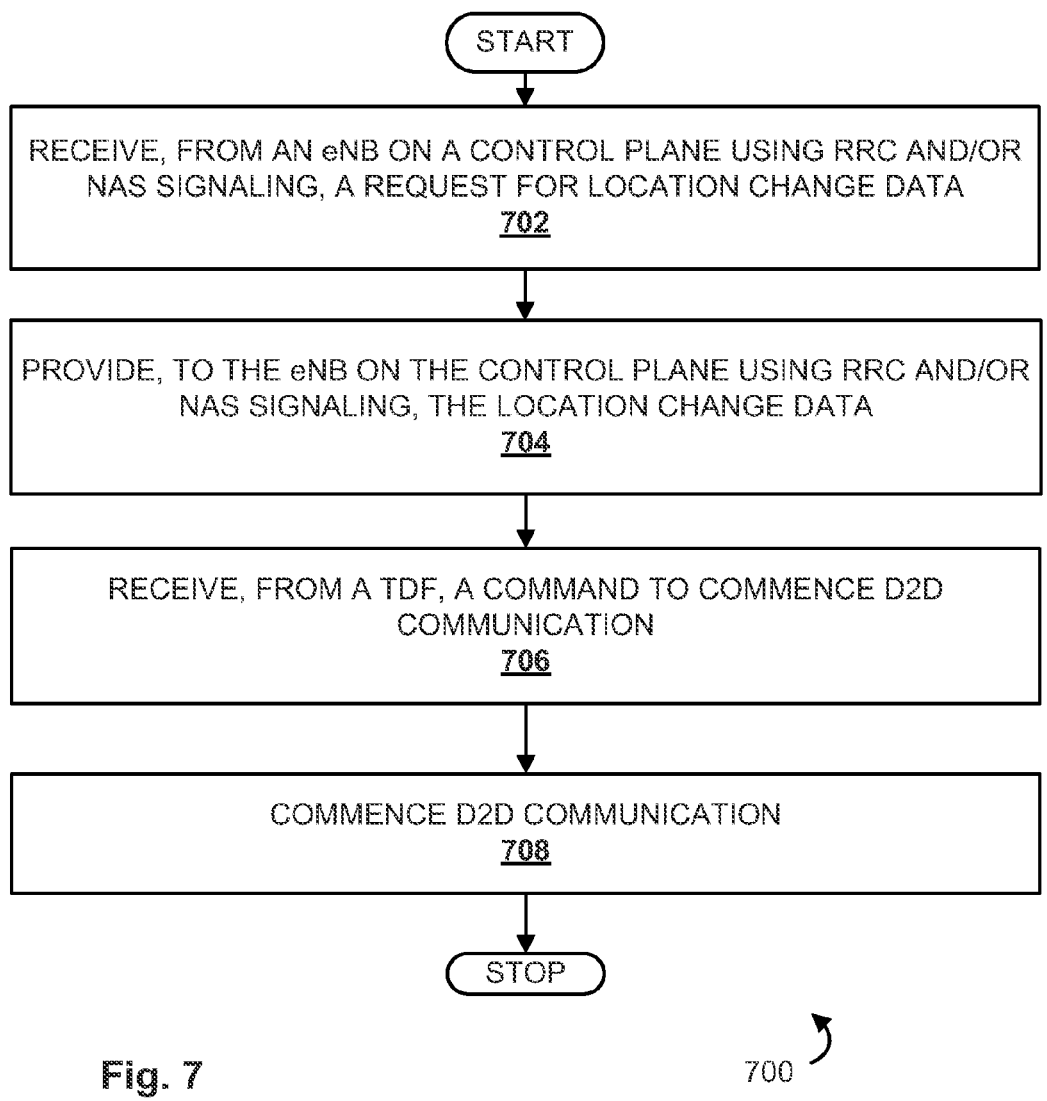
FIG. 7 schematically depicts an example method that may be implemented by a UE, in accordance with various embodiments.
Figure 8:
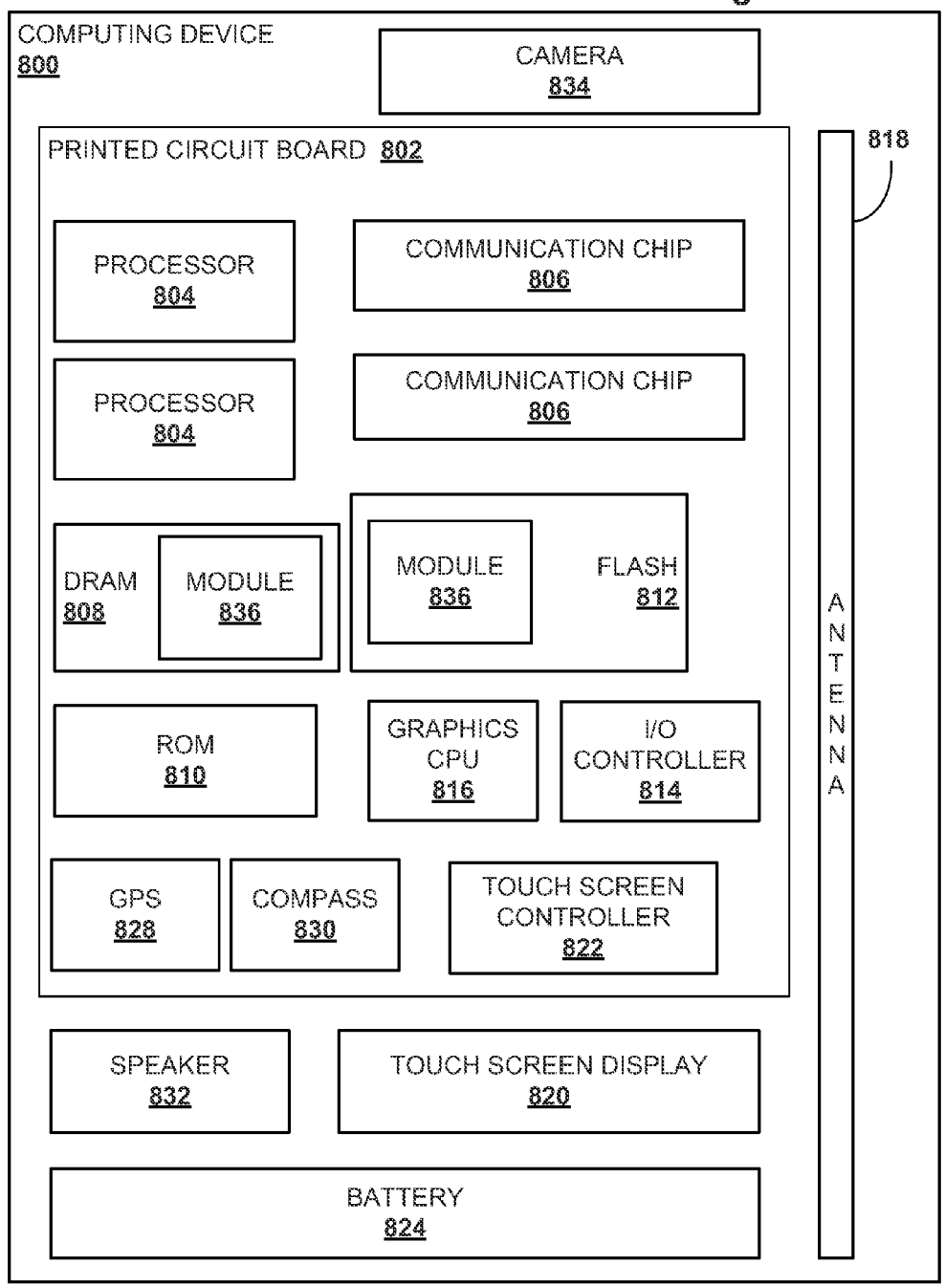
FIG. 8 schematically depicts an example computing device on which disclosed methods and computer-readable media may be implemented, in accordance with various embodiments.

FIG. 7 depicts an example method 700 that may be implemented by, e.g., first UE 102 or second UE 104. At block 702, a UE (e.g., first UE 102) may receive, from an eNB (e.g., eNB 106) serving the UE, on a control plane using at least one of RRC and NAS signaling, a request for location change data. At block 704, the UE may provide, to the eNB on a control plane using at least one of RRC and NAS signaling, the location change data. At block 706, the UE may receive, e.g., from a TDF (e.g., TDF 112), a command to commence D2D communication with another UE (e.g., second UE 104) served by the eNB, e.g., upon the TDF determining that the UE and the another UE are sufficiently proximate to exchange data directly and are likely to remain proximate for at least a predetermined time interval. At block 708, the UE may commence D2D with the another UE served by the eNB FIG. 8 illustrates an example computing device 800, in accordance with various embodiments. UE (e.g., 102, 104) or another network entity (e.g., 108, 110, 112) as described herein may be implemented on a computing device such as computing device 800. Computing device 800 may include a number of components, one or more processor(s) 804 and at least one communication chip 806. In various embodiments, the one or more processor(s) 804 each may be a processor core. In various embodiments, the at least one communication chip 806 may also be physically and electrically coupled to the one or more processors 804. In further implementations, the communication chip 806 may be part of the one or more processors 804. In various embodiments, computing device 800 may include printed circuit board ("PCB") 802. For these embodiments, the one or more processors 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, volatile memory (e.g., dynamic random access memory 808, also referred to as "DRAM"), non-volatile memory (e.g., read only memory 810, also referred to as "ROM"), flash memory 812, an input/output controller 814, a digital signal processor (not shown), a crypto processor (not shown), a graphics processor 816, one or more antenna 818, a display (not shown), a touch screen display 820, a touch screen controller 822, a battery 824, an audio codec (not shown), a video codec (not shown), a global positioning system ("GPS") device 828, a compass 830, an accelerometer (not shown), a gyroscope (not shown), a speaker 832, a camera 834, and a mass storage device (such as hard disk drive, a solid state drive, compact disk ("CD"), digital versatile disk ("DVD")) (not shown), and so forth. In various embodiments, the processor 804 may be integrated on the same die with other components to form a System on Chip ("SoC").

In various embodiments, volatile memory (e.g., DRAM 808), non-volatile memory (e.g., ROM 810), flash memory 812, and the mass storage device may include programming instructions configured to enable computing device 800, in response to execution by one or more processors 804, to practice all or selected aspects of methods 300, 400, 600 or 700, depending on whether computing device 800 is used to implement first UE 102, second UE 104, TDF 112, eNB 106, E-SMLC 110, or G-MLC 111. More specifically, one or more of the memory components such as volatile memory (e.g., DRAM 808), non-volatile memory (e.g., ROM 810), flash memory 812, and the mass storage device may include temporal and/or persistent copies of instructions that, when executed, by one or more processors 804, enable computing device 800 to operate one or more modules 836 configured to practice all or selected aspects of methods 300, 400, 600 or 700, depending on whether computing device 800 is used to implement first UE 102, second UE 104, TDF 112, eNB 106, E-SMLC 110, or G-MLC 111.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 802.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 800 may be any other electronic device that processes data.

Embodiments of apparatus, packages, computer-implemented methods, systems, devices, and computer-readable media (transitory and non-transitory) are described herein for a TDF configured to ascertain that a first UE and a second UE are, potentially, sufficiently proximate to each other to wirelessly exchange data directly. In various embodiments, the TDF may instruct an E-SMLC to obtain location change data associated with the first and second UEs. In various embodiments, the TDF may determine, based on the location change data, whether the first and second UEs are sufficiently proximate to exchange data directly, and whether the first and second UEs are likely to remain proximate for at least a predetermined time interval. In various embodiments, the TDF may cause the first and second UEs to commence D2D communication based on the determination.

In various embodiments, the location change data may include information about a velocity and/or acceleration of the first or second UE. In various embodiments, the location change data may include comprises information about a rate of change of relative locations of the first and second UEs.

In various embodiments, the TDF may instruct the E-SMLC to obtain the location change data via at least one of RRC or NAS signaling over a control plane of a RAN. In various embodiments, the TDF may instruct an MME to cause the first and second UEs to commence D2D communication. In various embodiments, the TDF may instruct the MME to use NAS signaling to instruct the first and second UEs to commence D2D communication. In various embodiments, the TDF may instruct the E-SMLC using a direct signaling interface.

In various embodiments, the TDF may ascertain that the first and second UEs are, potentially, sufficiently proximate to each other to wirelessly exchange data directly based on a request from the first or second UE. In various embodiments, the TDF may ascertain that the first and second UEs are, potentially, sufficiently proximate to each other to wirelessly exchange data directly based on a request for location services from an eNB in communication with and/or serving the first or second UE.

In various embodiments, an eNB may be configured to obtain, from an E-SMLC, a request for location change data associated with a first UE or a second UE. In various embodiments, the eNB may obtain, from the first or second UE using RRC and/or NAS signaling, the location change data. In various embodiments, the eNB may provide the location change data to the E-SMLC. In various embodiments, receipt of the request for location change data and provision of the location change data are direct to the E-SMLC, bypassing a MME.

In various embodiments, a system may include one or more processors, memory operably coupled to the one or more processors, and instructions in the memory that, when executed by the one or more processors, cause the one or more processors to operate an E-SMLC. In various embodiments, the E-SMLC may be configured to receive, from a TDF, a request for location change data associated with a first UE or a second UE. In various embodiments, the E-SMLC may be configured to request, from the first UE, the second UE, or an eNB serving the first or second UE, the location change data. In various embodiments, the E-SMLC may be configured to transmit the location change data to the TDF. In various embodiments, the location change data may include information about a velocity of the first or second UE. In various embodiments, the E-SMLC may be further configured to cause the eNB to obtain the location change data from the first or second UE using radio resource control signaling. In various embodiments, the E-SMLC may be configured to receive the request from the TDF via an MME. In various embodiments, the E-SMLC may be configured to receive the request directly from the TDF, bypassing an MME. In various embodiments, the E-SMLC may include a Bluetooth transceiver.

In various embodiments, a UE may include processing circuitry to receive, from an eNB serving the UE, using at least one of RRC and NAS signaling, a request for location change data. In various embodiments, the processing circuitry may be configured to provide, to the eNB using at least one of RRC and NAS signaling, the location change data. In various embodiments, the processing circuitry may be configured to commence D2D communication with another UE served by the eNB responsive to a determination that the UE and the another UE are sufficiently proximate to exchange data directly and are likely to remain proximate for at least a predetermined time interval. In various embodiments, the processing circuitry may be configured to commence the D2D communication with the another UE responsive to a command from a TDF.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computing device comprising processing circuitry to operate a traffic detection function ("TDF") to:
   ascertain that a first user equipment ("UE") and a second UE are, potentially, sufficiently proximate to each other to wirelessly exchange data directly;
   instruct an evolved serving mobile location center ("E-SMLC") to obtain location change data associated with the first and second UEs, the location change data to include at least one of information about a velocity of the first or second UE or information about acceleration of the first or second UE;
   determine, based on the location change data, whether the first and second UEs are sufficiently proximate to exchange data directly, and whether the first and second UEs are likely to remain proximate for at least a predetermined time interval; and
   cause the first and second UEs to commence device-to-device ("D2D") communication based on the determination.

2. The computing device of claim 1, wherein the TDF is further to instruct the E-SMLC to obtain the location change data via at least one of radio resource control ("RRC") or non-access stratum ("NAS") signaling over a control plane of a radio access network ("RAN").

3. The computing device of claim 1, wherein the TDF is further to instruct a mobility management entity ("MME") to cause the first and second UEs to commence ("D2D") communication.

4. The computing device of claim 3, wherein the TDF is further to instruct the MME to use non-access stratum ("NAS") signaling to instruct the first and second UEs to commence ("D2D") communication.

5. The computing device of claim 1, wherein the TDF is further to instruct the E-SMLC using a direct signaling interface.

6. The computing device of claim 1, wherein the TDF ascertains that the first and second UEs are, potentially, sufficiently proximate to each other to wirelessly exchange data directly based on a request from the first or second UE.

7. The computing device of claim 1, wherein the TDF ascertains that the first and second UEs are, potentially, sufficiently proximate to each other to wirelessly exchange data directly based on a request for location services from an evolved Node B ("eNB") serving the first or second UE.

8. At least one non-transitory computer-readable medium comprising instructions that, in response to execution of the instructions by a computing device, enable the computing device to:
  obtain a request to determine whether a first user equipment ("UE") and a second UE in communication with each other through a wireless wide area network ("WWAN") are likely to remain proximate to each other for a predetermined time interval that indicates sufficient time to warrant device-to-device communication;
  instruct an evolved serving mobile location center ("E-SMLC") to obtain location change data associated with the first and second UEs, the location change data to include at least one of information about a velocity of the first or second UE or information about acceleration of the first or second UE; and
  cause the first and second UEs to commence ("D2D") communication where it is determined, based on the location change data, that the first and second UEs are likely to remain proximate for at least a predetermined time interval.

9. The at least one non-transitory computer-readable medium of claim 8, further comprising instructions that, in response to execution of the instructions by the computing device, enable the computing device to instruct a mobility management entity ("MME") to cause the first and second UEs to commence ("D2D") communication.

10. The at least one non-transitory computer-readable medium of claim 9 further comprising instructions that, in response to execution of the instructions by the computing device, enable the computing device to instruct the MME to use non-access stratum signaling to instruct the first and second UEs to commence ("D2D") communication.

11. The at least one non-transitory computer-readable medium of claim 8, wherein the computing device instructs the E-SMLC using a direct signaling interface.

12. The at least one non-transitory computer-readable medium of claim 8, wherein the request is obtained from the first or second UE to provide the location change data.

13. The at least one non-transitory computer-readable medium of claim 8, wherein the request is a request for location services obtained from an evolved Node B ("eNB") serving the first or second UE.

14. An evolved Node B ("eNB"), comprising:
  one or more processors;
  memory operably coupled to the one or more processors; and
  instructions in the memory that, when executed by the one or more processors, enable the one or more processors to:
  receive, from an evolved serving mobile location center ("E-SMLC"), a request for location change data associated with a first user equipment ("UE") or a second UE served by the eNB, the location change data to include at least one of information about a velocity of the first or second UE or information about acceleration of the first or second UE;
  obtain, from the first or second UE using at least one of radio resource control ("RRC") and non-access stratum ("NAS") signaling, the location change data; and
  provide the location change data to the E-SMLC.

15. The eNB of claim 14, wherein receipt of the request for location change data and provision of the location change data are direct to the E-SMLC, bypassing a mobility management entity ("MME").

16. A user equipment ("UE") comprising processing circuitry to:
  receive, from an evolved Node B ("eNB") serving the UE using at least one of radio resource control ("RRC") and non-access stratum ("NAS") signaling, a request for location change data; and
  provide, to the eNB using at least one of RRC and NAS signaling, the location change data, the location change data to include at least one of information about a velocity of the UE or information about acceleration of the UE.

17. The UE of claim 16, wherein the location change data further comprises information about a velocity of another UE served by the eNB.

18. The UE of claim 16, wherein the location change data further comprises information about acceleration of another UE served by the eNB.

19. The UE of claim 16, wherein the processing circuitry is further to commence device-to-device ("D2D") communication with another UE served by the eNB.

20. The UE of claim 19, wherein the processing circuitry is further to commence the ("D2D") communication with the another UE responsive to a determination that the UE and the another UE are sufficiently proximate to exchange data directly and are likely to remain proximate for at least a predetermined time interval.

21. The UE of claim 19, wherein the processing circuitry is further to commence the ("D2D") communication with the another UE responsive to a command from a traffic detection function ("TDF").

* * * * *